United States Patent
Miller et al.

(10) Patent No.: US 9,801,238 B2
(45) Date of Patent: Oct. 24, 2017

(54) DYNAMIC CONTROL SYSTEM FOR A MAGNETRON TUBE IN A MICROWAVE OVEN

(71) Applicant: ACP, Inc., Cedar Rapids, IA (US)

(72) Inventors: Thomas Miller, Kalona, IA (US); Robert A Schulte, Williamsburg, IA (US)

(73) Assignee: ACP, INC, Cedar Rapids, IA (US)

( * ) Notice: Subject to any disclaimer, the term of this patent is extended or adjusted under 35 U.S.C. 154(b) by 1125 days.

(21) Appl. No.: 13/904,612

(22) Filed: May 29, 2013

(65) Prior Publication Data

US 2013/0320002 A1     Dec. 5, 2013

Related U.S. Application Data (60) Provisional application No. 61/653,056, filed on May 30, 2012.

(51) Int. Cl.
  H05B 6/66   (2006.01)
  H05B 6/64   (2006.01)
  H05B 6/68   (2006.01)

(52) U.S. Cl.
  CPC ........... *H05B 6/6447* (2013.01); *H05B 6/683* (2013.01); *Y02B 40/143* (2013.01)

(58) Field of Classification Search
  CPC ..... H05B 6/6447; H05B 6/683; Y02B 40/143
  USPC ........................................................ 219/702
  See application file for complete search history.

(56) References Cited

U.S. PATENT DOCUMENTS

| | | | | |
|---|---|---|---|---|
| 4,011,428 A | * | 3/1977 | Fosnough | G04G 15/00 219/506 |
| 4,023,004 A | | 5/1977 | Burke | |
| 4,121,149 A | | 10/1978 | Seltzer | |
| 4,420,668 A | | 12/1983 | Larson et al. | |
| 4,447,693 A | * | 5/1984 | Buck | H05B 6/6435 219/705 |
| 4,825,028 A | | 4/1989 | Smith | |
| 4,918,276 A | * | 4/1990 | Oh | H05B 6/645 219/710 |

(Continued)

FOREIGN PATENT DOCUMENTS

| | | |
|---|---|---|
| JP | H0362496 | 3/1991 |
| JP | H03241693 | 10/1991 |

(Continued)

*Primary Examiner* — Christopher Kim
*Assistant Examiner* — Adam J Rogers
(74) *Attorney, Agent, or Firm* — Diederiks & Whitelaw, PLC (57) ABSTRACT

A microwave oven having a cabinet, a door, a programming interface, a magnetron tube that capable of being dynamically controlled, a controller configured to control the magnetron tube, and a microwave generating system is described. A method of dynamically controlling the magnetron tube in the microwave oven by utilizing a magnetron power supply is also described. By monitoring a current to the magnetron power supply, determining the current to the magnetron power supply at which the magnetron tube conducts, calculating a time base, and adjusting the time base as the power level required is increased, the control produces consistent power when the magnetron tube is cycled at less than a 100% power level and to compensate for a slow start of the magnetron tube during a short cook cycle.

16 Claims, 4 Drawing Sheets

(56) References Cited

U.S. PATENT DOCUMENTS

| | | | |
|---|---|---|---|
| 4,990,733 A | | 2/1991 | Joelsson et al. |
| 5,003,141 A | | 3/1991 | Braunisch et al. |
| 5,045,658 A | | 9/1991 | Smith |
| 5,283,410 A | * | 2/1994 | Kim ............... H05B 6/6411 |
| | | | 177/145 |
| 5,286,938 A | | 2/1994 | Takei et al. |
| 5,317,133 A | | 5/1994 | Sundström et al. |
| 6,150,637 A | * | 11/2000 | Arroubi ............ H05B 6/687 |
| | | | 219/413 |
| 6,249,710 B1 | * | 6/2001 | Drucker .......... G05D 23/1917 |
| | | | 219/702 |
| 6,472,649 B2 | * | 10/2002 | Lee ................. H05B 6/666 |
| | | | 219/702 |
| 6,538,240 B1 | * | 3/2003 | Shon ............... H05B 6/6458 |
| | | | 219/704 |
| 7,554,061 B2 | * | 6/2009 | Ruther ............. F24C 7/08 |
| | | | 219/492 |
| 2008/0290087 A1 | * | 11/2008 | Ben-Shmuel ....... A23L 3/01 |
| | | | 219/748 |
| 2009/0236335 A1 | * | 9/2009 | Ben-Shmuel ...... H05B 6/6402 |
| | | | 219/710 |

FOREIGN PATENT DOCUMENTS

| | | |
|---|---|---|
| JP | 0636872 | 2/1994 |
| JP | 2005228596 | 8/2005 |
| WO | WO 00/40056 | 7/2000 |

\* cited by examiner

DYNAMIC CONTROL SYSTEM FOR A MAGNETRON TUBE IN A MICROWAVE OVEN

CROSS-REFERENCE TO RELATED APPLICATIONS

The present application claims the benefit of U.S. Provisional Patent Application Ser. No. 61/653,056 entitled "Dynamic Magnetron Control for Microwave Oven" filed May 30, 2012.

BACKGROUND OF THE INVENTION

Field of the Invention

The present invention pertains to the art of microwave cooking and, more particularly, to dynamically controlling the timing of a magnetron in a microwave oven to produce consistent power particularly when the magnetron is cycled at less than 100% power and to compensate for a slow starting magnetron during a short cook cycle.

Discussion of the Prior Art

As widely known in the art, a microwave employs a magnetron to generate microwaves which are directed into an oven cavity for cooking purposes. Microwave ovens that use a switching power supply can effectively lower the power produced by the magnetron by lowering the tube current, but this type of power supply is costly and has reliability issues. Microwave ovens that use a standard cold start power supply operate by cycling the magnetron on and off during a predetermined cycle time to lower the effective power. So, if for example, 50% microwave power is required, the magnetron is turned on 50% of the time, plus some constant factor to compensate for the start time of the magnetron. On the first cycle, the start time is longer than subsequent starts because of tube heating, but this is not normally considered in this type of scheme. This operational scheme can cause inconsistency in the actual power produced from one cook cycle to another. Furthermore, as the tube ages, the start time increases causing less actual power to be produced later in life.

The following chart shows an example of the relative power levels and magnetron timing used with this known type of arrangement, assuming a 2 second average tube start time. The problem is when the tube start time increases or decreases so does the effective power output.

TABLE 1

| MW_percent_setting | Power on time [s] | Power off time [s] | Actual power level [%] |
|---|---|---|---|
| 10 | 5 | 25 | 10 |
| 20 | 8 | 22 | 20 |
| 30 | 11 | 19 | 30 |
| 40 | 14 | 16 | 40 |
| 50 | 17 | 13 | 50 |
| 60 | 20 | 10 | 60 |
| 70 | 23 | 7 | 70 |
| 80 | 26 | 4 | 80 |
| 90 | 29 | 1 | 90 |

Based on the above, there is seen to exist a need to produce more consistent power when a magnetron of a microwave oven is cycled at less than 100% power and to compensate for a slow starting magnetron during a short cook cycle.

SUMMARY OF THE INVENTION

The present invention is particularly concerned with compensating for the variation in start times of a tube of the magnetron of a microwave oven by utilizing a dynamic time base for the cycle time to ensure the actual power level required is produced. More particularly, the invention employs an algorithm to adjust the cycle time base and on time of the tube depending on the power level required and the tube start time for each cycle of the tube. The start time of the tube is derived by measuring current to a magnetron power supply and finding the threshold where the tube conducts. The time base must be long enough to allow for sufficient on and off time of the magnetron for the longest allowable tube start time. At the same time, the time base must not be too short to cause more cycling of the magnetron than necessary. To achieve both objectives, a non-linear algorithm is used to adjust the time base more at higher requested power levels than at lower power levels and more when the tube start time is longer than when it is shorter.

In accordance with the invention, a non-linear polynomial is employed to prevent the cycle times from becoming excessively long when the tube starts are 4 or 5 seconds long. In particular, the non-linear polynomial is used to adjust the time base as the required power level increases, and then the curve is slid along the x-axis as the tube start time increases. The polynomial keeps the time base to a reasonable length, with tube start times up to 8 seconds while maintaining a minimum of 11 seconds for the time base at low power levels so cycling is not excessive. Additional objects, features and advantages of the present invention will become more readily apparent from the following detailed description of preferred embodiments when taken in conjunction with the drawing wherein like reference numerals refer to corresponding parts.

DETAILED DESCRIPTION OF THE PREFERRED EMBODIMENTS

Figure 1:
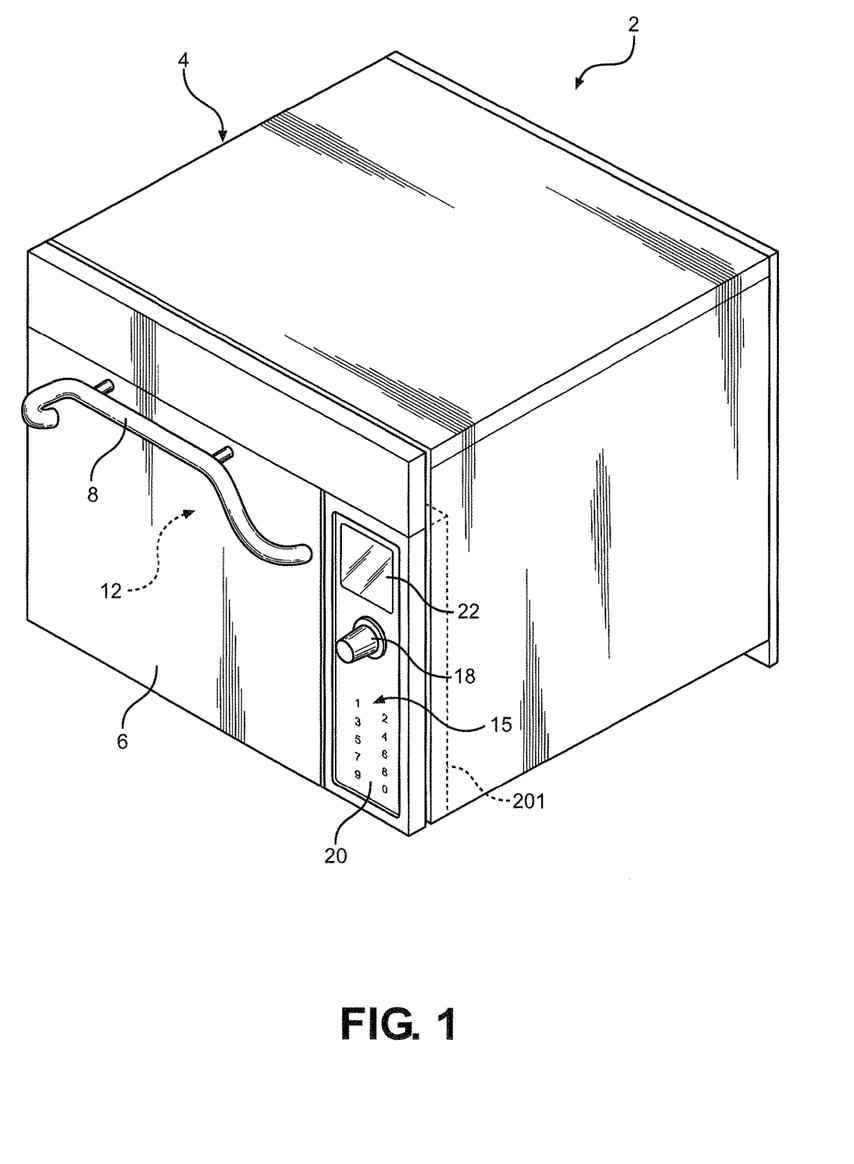
FIG. 1 is an upper right perspective view of a cooking appliance incorporating a dynamic magnetron control system constructed in accordance with the present invention.

With initial reference to FIG. 1, a microwave oven constructed in accordance with the present invention is generally indicated at 2. As will be detailed more fully below, the microwave oven 2 employs an algorithm to adjust the cycle time base and on time of a magnetron tube depending on the power level required and the tube start time for each cycle of the tube. The start time of the tube is derived by measuring current to the power supply and finding the threshold where the tube conducts.

As shown in an exemplary embodiment, microwave oven 2 includes a cabinet 4 and a door 6 that is provided with a handle 8. As shown, door 6 is pivotally mounted about a lower horizontal axis such that handle 8 can be utilized to open door 6 in order to access an internal oven cavity 12. However, a vertical pivoting arrangement, or another type of door opening system, could be readily employed. Microwave oven 2 also includes a programming interface 15 which is shown to include a control knob 18, a key pad 20 and a touch pad display 22 to enable a user to input, for example, cook times or the desired power levels through programming interface 15.

Figure 2:
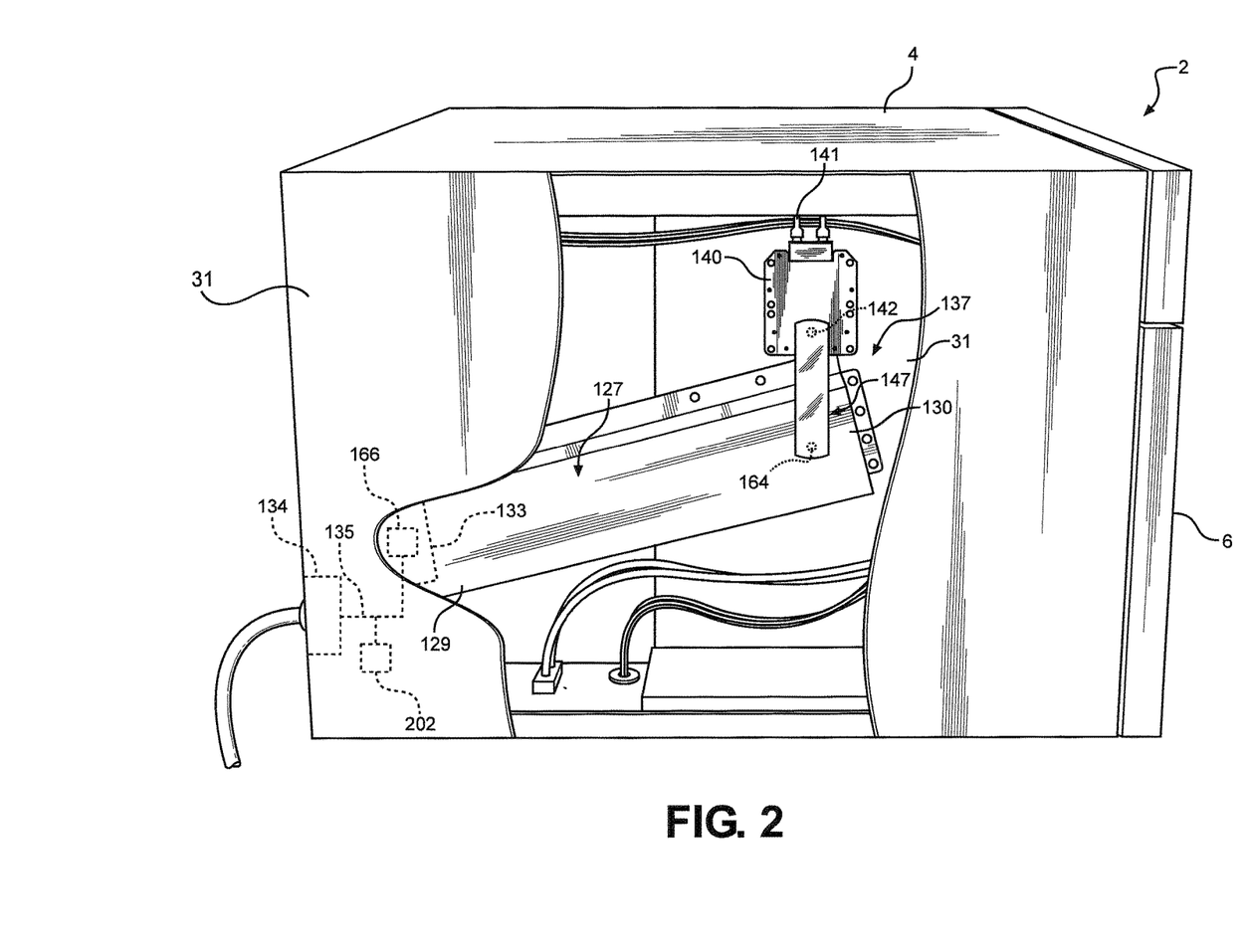
FIG. 2 is a partial cut-out side view of the cooking appliance of FIG. 1.

As best shown in FIG. 2, microwave oven 2 is provided with a pair of wave guides mounted along opposing side walls 31, with one of the waveguides being indicated at 127. Basically, the arrangement on each side of oven cavity 12 is preferably, identically constructed such that reference will be made in detailing one side arrangement. In any case, in connection with the microwave system employed, waveguide 127 includes a first end portion 129 and a second end portion 130. Generically indicated at 133 is a magnetron for generating microwaves which propagate through waveguide 127 and are lead into oven cavity 12. Magnetron 133 receives power from a magnetron power supply 134 through a line 135. At second end portion 130 is provided a stirrer assembly generally indicated at 137. In the preferred embodiment shown, stirrer assembly 137 includes a motor housing 140 to which is applied electric current through wires 141. Motor housing 140 has associated therewith a rotatable output shaft 142 linked to a mechanism 147 for transferring the rotation of output shaft 142 to a drive member 164. Drive member 164 is fixed for rotation to a rotatable stirrer (not shown), which is mounted behind a side wall. In any case, the stirrers (not shown) provided on side walls 31 further enhance the distribution of the microwaves for oven cavity 12. The present invention is intended to be utilized by microwave oven systems with one or more magnetrons.

In accordance with the invention, variations in start times of a tube 166 of magnetron 133 of microwave oven 2 is accomplished by utilizing a dynamic time base for the cycle time to ensure the actual power level required is produced. The time base is established to be long enough to allow for sufficient on and off time of the magnetron for the longest allowable tube start time. Yet, the time base is not too short to cause more cycling of the magnetron 133 than necessary. To achieve both objectives, a non-linear algorithm is used to adjust the time base more at higher requested power levels than at lower power levels and more when the tube start time is longer than when it is shorter.

The time base is the amount of repeating cycle time for the magnetron tube when it is operating at less than 100% power levels. In other words, the time base relates to the cycled time interval at which the microwave outputs power. By way of example, when a 1000 watt microwave oven is set to operate at a 100% power level, for a duration of 1 minute, the microwave will output the 1000 watts of power for the full duration of 1 minute (i.e., 100% of the time). By contrast, a microwave set to a 50% power level would output 1000 watts of power for 30 seconds of the 1 minute duration (i.e., 50% of the time). The 30 seconds of on-time are divided into a cycled time base interval, such as 5 seconds on and then 5 seconds off for the duration of 1 minute. The end result is 500 watts of power during the 1 minute duration, or 50% of the 1000 watt power output by the microwave.

Below is a table or chart presenting certain standard timing for a magnetron with an average 2 second start time, along with examples of adjusted cycle times (in bold) required to maintain a minimum of 1 second off time at the end of the cycle for tube start times of 3 to 8 seconds in accordance with the invention (note actual % is rounded to the nearest whole number).

TABLE 2

| Tube start time [s] | MW % | Cycle time | Mag power on time | ON time | OFF time | Normal off time at end | Actual % |
|---|---|---|---|---|---|---|---|
| 2 | 10% | 12.0 | 3.0 | 1.0 | 11.0 | 9.0 | 8% |
| 2 | 20% | 12.0 | 4.0 | 2.0 | 10.0 | 8.0 | 17% |
| 2 | 30% | 12.0 | 5.0 | 3.0 | 9.0 | 7.0 | 25% |
| 2 | 40% | 12.0 | 6.0 | 4.0 | 8.0 | 6.0 | 33% |
| 2 | 50% | 12.0 | 7.0 | 5.0 | 7.0 | 5.0 | 42% |
| 2 | 60% | 12.0 | 8.0 | 6.0 | 6.0 | 4.0 | 50% |
| 2 | 70% | 12.0 | 9.0 | 7.0 | 5.0 | 3.0 | 58% |
| 2 | 80% | 12.0 | 10.0 | 8.0 | 4.0 | 2.0 | 67% |
| 2 | 90% | 12.0 | 11.0 | 9.0 | 3.0 | 1.0 | 75% |
| 3 | 10% | 12.0 | 4.0 | 1.0 | 11.0 | 8.0 | 8% |
| 3 | 20% | 12.0 | 5.0 | 2.0 | 10.0 | 7.0 | 17% |
| 3 | 30% | 12.0 | 6.0 | 3.0 | 9.0 | 6.0 | 25% |
| 3 | 40% | 12.0 | 7.0 | 4.0 | 8.0 | 5.0 | 33% |
| 3 | 50% | 12.0 | 8.0 | 5.0 | 7.0 | 4.0 | 42% |
| 3 | 60% | 12.0 | 9.0 | 6.0 | 6.0 | 3.0 | 50% |
| 3 | 70% | 12.0 | 10.0 | 7.0 | 5.0 | 2.0 | 58% |
| 3 | 80% | 15.0 | 13.0 | 10.0 | 5.0 | 2.0 | 67% |
| 3 | 90% | 16.0 | 15.0 | 12.0 | 4.0 | 1.0 | 75% |
| 4 | 10% | 12.0 | 5.0 | 1.0 | 11.0 | 7.0 | 8% |
| 4 | 20% | 12.0 | 6.0 | 2.0 | 10.0 | 6.0 | 17% |
| 4 | 30% | 12.0 | 7.0 | 3.0 | 9.0 | 5.0 | 25% |
| 4 | 40% | 12.0 | 8.0 | 4.0 | 8.0 | 4.0 | 33% |
| 4 | 50% | 12.0 | 9.0 | 5.0 | 7.0 | 3.0 | 42% |
| 4 | 60% | 12.0 | 10.0 | 6.0 | 6.0 | 2.0 | 50% |
| 4 | 70% | 14.5 | 12.5 | 8.5 | 6.0 | 2.0 | 58% |
| 4 | 80% | 18.0 | 16.0 | 12.0 | 6.0 | 2.0 | 67% |
| 4 | 90% | 20.0 | 19.0 | 15.0 | 5.0 | 1.0 | 75% |
| 5 | 10% | 12.0 | 6.0 | 1.0 | 11.0 | 6.0 | 8% |
| 5 | 20% | 12.0 | 7.0 | 2.0 | 10.0 | 5.0 | 17% |
| 5 | 30% | 12.0 | 8.0 | 3.0 | 9.0 | 4.0 | 25% |
| 5 | 40% | 12.0 | 9.0 | 4.0 | 8.0 | 3.0 | 33% |
| 5 | 50% | 12.0 | 10.0 | 5.0 | 7.0 | 2.0 | 42% |
| 5 | 60% | 14.0 | 12.0 | 7.0 | 7.0 | 2.0 | 50% |
| 5 | 70% | 16.9 | 14.9 | 9.9 | 7.0 | 2.0 | 58% |
| 5 | 80% | 21.0 | 19.0 | 14.0 | 7.0 | 2.0 | 67% |
| 5 | 90% | 24.0 | 23.0 | 18.0 | 6.0 | 1.0 | 75% |
| 6 | 10% | 12.0 | 7.0 | 1.0 | 11.0 | 5.0 | 8% |
| 6 | 20% | 12.0 | 8.0 | 2.0 | 10.0 | 4.0 | 17% |
| 6 | 30% | 12.0 | 9.0 | 3.0 | 9.0 | 3.0 | 25% |
| 6 | 40% | 12.0 | 10.0 | 4.0 | 8.0 | 2.0 | 33% |
| 6 | 50% | 13.7 | 11.7 | 5.7 | 8.0 | 2.0 | 42% |
| 6 | 60% | 16.0 | 14.0 | 8.0 | 8.0 | 2.0 | 50% |
| 6 | 70% | 19.2 | 17.2 | 11.2 | 8.0 | 2.0 | 58% |
| 6 | 80% | 24.0 | 22.0 | 16.0 | 8.0 | 2.0 | 67% |
| 6 | 90% | 28.0 | 27.0 | 21.0 | 7.0 | 1.0 | 75% |
| 7 | 10% | 12.0 | 8.0 | 1.0 | 11.0 | 4.0 | 8% |
| 7 | 20% | 12.0 | 9.0 | 2.0 | 10.0 | 3.0 | 17% |
| 7 | 30% | 12.0 | 10.0 | 3.0 | 9.0 | 2.0 | 25% |
| 7 | 40% | 13.5 | 11.5 | 4.5 | 9.0 | 2.0 | 33% |
| 7 | 50% | 15.5 | 13.5 | 6.5 | 9.0 | 2.0 | 42% |
| 7 | 60% | 18.0 | 16.0 | 9.0 | 9.0 | 2.0 | 50% |
| 7 | 70% | 21.5 | 19.5 | 12.5 | 9.0 | 2.0 | 58% |
| 7 | 80% | 27.0 | 25.0 | 18.0 | 9.0 | 2.0 | 67% |
| 7 | 90% | 32.0 | 31.0 | 24.0 | 8.0 | 1.0 | 75% |
| 8 | 10% | 12.0 | 9.0 | 1.0 | 11.0 | 3.0 | 8% |
| 8 | 20% | 12.0 | 10.0 | 2.0 | 10.0 | 2.0 | 17% |
| 8 | 30% | 13.3 | 11.3 | 3.3 | 10.0 | 2.0 | 25% |
| 8 | 40% | 15.0 | 13.0 | 5.0 | 10.0 | 2.0 | 33% |
| 8 | 50% | 17.2 | 15.2 | 7.2 | 10.0 | 2.0 | 42% |
| 8 | 60% | 20.0 | 18.0 | 10.0 | 10.0 | 2.0 | 50% |
| 8 | 70% | 24.0 | 22.0 | 14.0 | 10.0 | 2.0 | 58% |
| 8 | 80% | 30.0 | 28.0 | 20.0 | 10.0 | 2.0 | 67% |
| 8 | 90% | 36.0 | 35.0 | 27.0 | 9.0 | 1.0 | 75% |

This data was stacked as indicated in Table 3 below and plotted to make the series of plots shown in FIG. 3. The y-axis is the cycle time and the x-axis is the power level. Each curve on the plot corresponds to a different tube start time.

TABLE 3

| 12.0 | 12.0 | 12.0 | 12.0 | 12.0 | 12.0 | 12.0 |
|---|---|---|---|---|---|---|
| 12.0 | 12.0 | 12.0 | 12.0 | 12.0 | 12.0 | 12.0 |
| 12.0 | 12.0 | 12.0 | 12.0 | 12.0 | 12.0 | 13.3 |

TABLE 3-continued

| | | | | | | |
|---|---|---|---|---|---|---|
| 12.0 | 12.0 | 12.0 | 12.0 | 12.0 | 13.5 | 15.0 |
| 12.0 | 12.0 | 12.0 | 12.0 | 13.7 | 15.5 | 17.2 |
| 12.0 | 12.0 | 12.0 | 14.0 | 16.0 | 18.0 | 20.0 |
| 12.0 | 12.0 | 14.5 | 16.9 | 19.2 | 21.5 | 24.0 |
| 12.0 | 15.0 | 18.0 | 21.0 | 24.0 | 27.0 | 30.0 |
| 12.0 | 16.0 | 20.0 | 24.0 | 28.0 | 32.0 | 36.0 |

Figure 3:
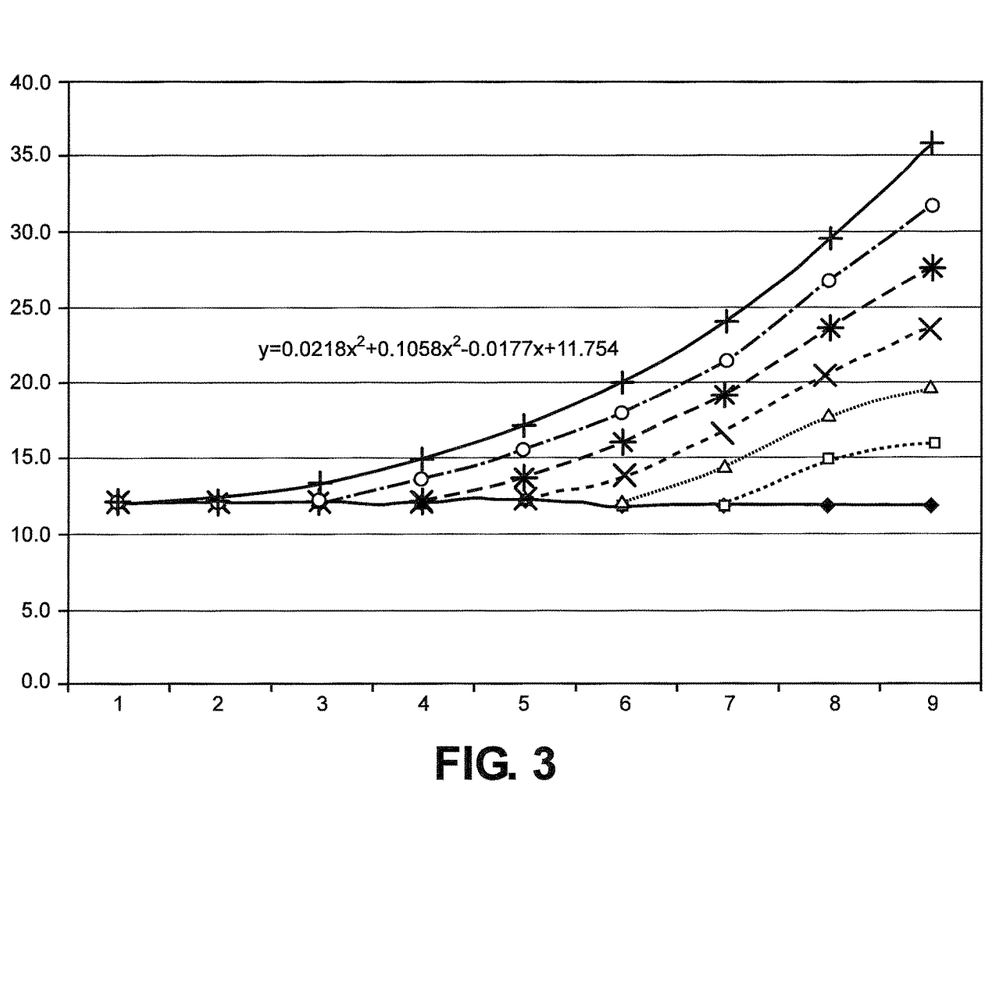
FIG. 3 is a graph of cycle time and power level, with multiple curves representing plots corresponding to different tube start times.

Since the series of curves are very similar with the exception of an offset in the x-axis, a $3^{rd}$ order polynomial was derived from the first curve and the formula adjusted to offset the plot according to the tube start time and a constant (see FIG. 3). This was then checked over the range of start times to verify the off time at the end of the cycle, as well as minimum and maximum cycle times. An 8 second tube start time is preferably the longest practical tube start time because of the long cycle time required, but longer start times can be accommodated with the algorithm.

The time base polynomial employed in accordance with the invention is as follows:

$$\text{"Time\_base"} = 0.0218 \times (\text{"MW\_percent\_setting"}/10 + \text{"Tube\_start\_time"} - 7)^3 + 0.1065 \times (\text{"MW\_percent\_setting"}/10 + \text{"Tube\_start\_time"} - 7)^2 - 0.0177 \times (\text{"MW\_percent\_setting"}/10 + \text{"Tube\_start\_time"} - 7) + 12$$

wherein a "MW_percent_setting" is a value that the user selects for the microwave power level by using programming interface 15 and a "Tube_start_time" indicates the amount of time between when power is supplied to the tube and when the tube begins to conduct.

Figure 4:
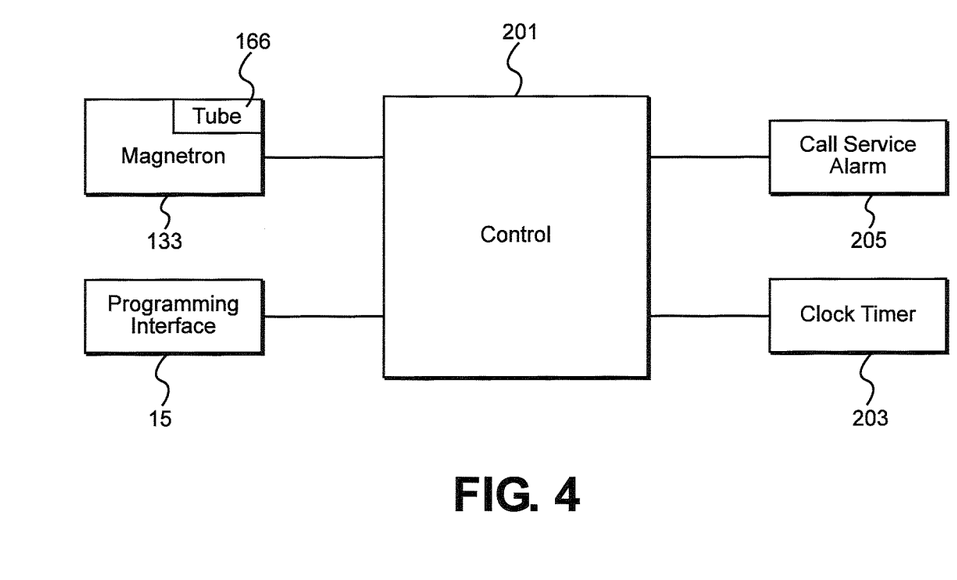
FIG. 4 is a schematic of a control arrangement employed in connection with the present invention.

With reference to FIG. 4, the dynamic time base calculation is conducted immediately after magnetron tube 166 conducts and is recalculated every time magnetron 133 is turned on. A processor or controller 201 detects both when magnetron tube 166 is turned on and when it actually conducts. "Time_base" calculations are based on power levels of 10% through 90% represented by the numbers 10 through 90 respectively in the time base algorithm. All time base values are preferably rounded to the nearest 0.1 seconds.

Controller 201 monitors a magnetron current with a sensor 202 that is connected to line 135. After magnetron 133 is turned on, controller 201 makes a determination as to when magnetron tube 166 begins to conduct and sets a "Magnetron Current Threshold" at that current level. Once 10 consecutive line cycles of current occur above the "Magnetron Current Threshold", a "Start Condition" is indicated. Because some line cycles may have failed, or not been complete cycles, an actual "Tube_start_time" is calculated using the measured time to the "Start Condition" minus the 10 consecutive line cycles of current measurement.

Another problem addressed with this invention is inconsistent heating when running short cook cycles. Since the first part of the invention requires that current to the magnetron power supply be monitored to find when the tube conducts, this can be used further. For very short cook cycles, the magnetron start time can have detrimental effects, even when running at 100% microwave power. If the cook cycle is only twice as long as the "Tube_start_time", the effective microwave power is only half of the expected value. To compensate for this, the cook cycle can automatically be extended by controller 201 by adding the "Tube_start_time" to the requested cook time with no intervention by the user. Also, on the first cook cycle, there will be less actual power than subsequent cook cycles and this is preferably compensated for in accordance with the invention. To this end, microwave oven 2 has a clock or countdown timer 203 to indicate when a cook cycle has completed and, in certain embodiments, controller 201 adds time to the cook cycle by stopping clock or countdown timer 203 until the tube starts or by adding time to countdown clock 203. Alternately, each tick of clock 203 is made longer than a second to add the compensation with the user being unaware that the compensation has taken effect.

As indicated above, a non-linear polynomial is employed to prevent cycle times from becoming excessively long (even for tube starts that are 4 or 5 seconds long). In particular, the non-linear polynomial is used to adjust the time base as the power level required increases, and then the curve is slid along the x-axis as the tube start time increases (see FIG. 3). The polynomial keeps the time base to a reasonable length, with tube start times up to 8 seconds, while preferably maintaining a minimum of 11 seconds for the time base at low power levels so cycling is not excessive.

A power level calculation relates to the magnetron power level timing, i.e., how long the magnetron shall be powered on after it conducts for the current time base cycle. As such, the power level calculation determines an "ON_time", which requires the use of the calculated "Time_base" in the calculation. The "ON_time" calculation employed in the present invention is as follows:

$$\text{"ON\_time"} = (\text{"Time\_base"} \times \text{"MW\_percent\_setting"})/120$$

A preferred microwave power cycling algorithm uses a 12 second time base and assumes magnetron 133 will start after power is applied for 2 seconds. In accordance with this embodiment, the 12 second time base can be adjusted according to the time it takes for the magnetron to conduct and adjust the on and off time during the cycle to maintain the actual power level achieved in the present controller 201. In the event that the time remaining in the cook cycle is less than 2 seconds more than the "Tube_start_time" from the previous time base cycle, controller 201 prevents magnetron 133 from turning on for the remainder of the cook cycle.

The microwave oven also preferably includes a "Dynamic Power Level" option. When this option is enabled, dynamic time base calculations are used to control the magnetron power level timing. When the "Dynamic Power Level" option is disabled, controller 201 shall work with the standard 12 second time base.

A Call Service function may also be provided and optionally turned on and off by the user using programming interface 15. When the "Call Service" alarm option is turned on, in the event that the magnetron does not start conducting within 8 seconds, controller 201 triggers a "Call Service" alarm 205 to indicate that microwave oven 2 might not be functioning properly and the user should consider calling for service of microwave oven 2. If the "Call Service" alarm option is turned off, controller 201 shall use a maximum magnetron start time of 10 seconds for the time base and power level calculation.

EXAMPLE

The following table or chart shows calculation examples in accordance with a preferred embodiment used when the dynamic power level option is enabled.

TABLE 4

| Tube_start_time | MW_percent_setting | Time_base | ON_time | OFF_Time | Mag power on time | Normal off time at end | Actual % |
|---|---|---|---|---|---|---|---|
| 1.5 | 10% | 12.2 | 1.0 | 11.2 | 2.5 | 9.7 | 8.33% |
| 2 | 30% | 12.3 | 3.1 | 9.2 | 5.1 | 7.2 | 25% |
| 3 | 50% | 12.1 | 5.0 | 7.1 | 8.0 | 4.1 | 41.67% |
| 4 | 80% | 17.3 | 11.5 | 5.8 | 15.5 | 1.8 | 66.67% |
| 5.1 | 40% | 12.6 | 4.2 | 8.4 | 9.3 | 3.3 | 33.33% |
| 6 | 20% | 12.1 | 2.0 | 10.1 | 8.0 | 4.1 | 16.67% |
| 7 | 70% | 24.6 | 14.3 | 10.2 | 21.3 | 3.2 | 58.33% |
| 8 | 60% | 24.6 | 12.3 | 12.3 | 20.3 | 4.3 | 50% |
| 6.4 | 90% | 32.3 | 24.2 | 8.1 | 30.6 | 1.7 | 75% |

In Table 4, the "Tube_start_time" represents the time the magnetron tube is powered to the time the magnetron tube conducts and is determined as previously mentioned. The "MW_percent_setting" indicates value the user selects for the microwave power level and inputs via programming interface 15. The "Time_base" is the repeating cycle time for the magnetron when running at less than 100% power level. The "ON_time" is calculated for the amount of time the magnetron is conducting during a time base cycle and an "OFF_time" is determined by subtracting the "ON_time" from the "Time_base". The "OFF_time" indicates the amount of time during the time base cycle that the tube is not conducting. A "Mag power on time" indicates the time the magnetron is powered on during one cycle of the time base and is the summation of the "Tube_start_time" and the "ON_time". A "normal off time at end" determination indicates the time in between when the tube is turned off and the end of the time base cycle. The "normal off time at end" is calculated by subtracting the "Tube_start_time" from the "OFF_time". A determination as to the actual percentage of time the tube actually conducts during a time base cycle can be made by dividing the "ON_time" by the calculated "Time_base", then multiplying result by 100%. The percentages used in the examples could also be changed to accommodate any requirements.

Based on the above, it should be readily apparent that the dynamic control system for controlling the timing of a magnetron tube in a microwave oven according to the invention produces consistent power when the magnetron is cycled at less than a 100% power level and can be used to compensate for a slow starting magnetron during a short cook cycle. By utilizing an algorithm to adjust the cycle time base and on time of the magnetron tube, depending on the power level required and the tube start time for each cycle of the tube, the dynamically controlled system can prevent the cycle times from becoming excessively long.

Although described with reference to preferred embodiments of the invention, it should be readily understood that various changes and/or modifications can be made to the invention without departing from the spirit thereof. For instance, although a preferred manner to produce the algorithm has been disclosed, it should be understood that there are various other ways of formulating the algorithm.

We claim:

1. A method of dynamically controlling a magnetron tube in a microwave oven utilizing a magnetron power supply comprising:
monitoring a current to the magnetron power supply;
determining the current to the magnetron power supply at which the magnetron tube conducts;
calculating a time base; and
adjusting the time base as the power level required is increased, to produce consistent power when the magnetron tube is cycled at less than a 100% power level and to compensate for a slow start of the magnetron tube during a short cook cycle.

2. A method as claimed in claim 1, wherein calculating the time base is based on a tube start time.

3. A method as claimed in claim 1, wherein calculating the time base is based on a microwave power level value that a user selects for the microwave oven.

4. A method as claimed in claim 1, wherein calculating the time base is based on a tube start time and a microwave power level value that a user selects for the microwave oven.

5. A method as claimed in 1, wherein calculating the time base includes employing a polynomial to prevent the cycle time from becoming excessively long.

6. A method as claimed in 5, wherein calculating the time base includes employing a polynomial to prevent the cycle time from becoming excessively long that is non-linear.

7. A method as claimed in claim 6, wherein the polynomial follows the relationship:

"Time_base"=0.0218×("MW_percent_setting"/10+ "Tube_start_time"−7)$^3$+0.1065×("MW_percent_setting"/10+"Tube_start_time"−7)$^2$−0.0177×( "MW_percent_setting"/10+"Tube_start_time"− 7)+12.

8. A method as claimed in claim 1, wherein the time base is calculated based on power levels of 10% through 90%.

9. A method as claimed in claim 1 wherein, upon being calculated, the time base is rounded to the nearest 0.1 seconds.

10. A method as claimed in claim 9, wherein the alarm indicates that the microwave oven needs service, and the predetermined time period is 8 seconds.

11. A method as claimed in claim 1, wherein the time base is recalculated every time the magnetron is turned on.

12. A method as claimed in claim 1, further comprising:
triggering an alarm if the magnetron does not start conducting within a predetermined time period.

13. A method as claimed in claim 1, further comprising:
calculating a tube start time;
adding the tube start time to a cook cycle; and
if time remaining in the cook cycle is less than a predetermined number of seconds more than the tube start time from a previous time base cycle, preventing the magnetron from turning on for a remainder of the cook cycle.

14. A method as claimed in claim 13, further comprising:
adding the calculated tube start time to the cook cycle by adding time to a countdown timer.

15. A method as claimed in claim 13, further comprising: making each unit change of a countdown timer longer than a second to compensate for the calculated tube start time.

16. The method as claimed in claim 1, wherein:
the time base is equal to a sum of a magnetron on time and a magnetron off time;
the magnetron on time is an amount of time the magnetron tube is conducting during a time base cycle; and
the magnetron off time is an amount of time the magnetron tube is not conducting during the time base cycle.

* * * * *